(12) United States Patent
Gentile

(10) Patent No.: US 10,377,289 B2
(45) Date of Patent: Aug. 13, 2019

(54) RADIUS ROTATING FLATBED

(71) Applicant: Dynamic Towing Equipment & Manufacturing Inc., Norfolk, VA (US)

(72) Inventor: Anthony Gentile, Hartsdale, NY (US)

(73) Assignee: Dynamic Towing Equipment & Manufacturing Inc., Norfolk, VA (US)

( * ) Notice: Subject to any disclaimer, the term of this patent is extended or adjusted under 35 U.S.C. 154(b) by 400 days.

(21) Appl. No.: 15/039,561

(22) PCT Filed: Dec. 15, 2014

(86) PCT No.: PCT/US2014/070290
§ 371 (c)(1),
(2) Date: May 26, 2016

(87) PCT Pub. No.: WO2015/095020
PCT Pub. Date: Jun. 25, 2015

(65) Prior Publication Data
US 2017/0043698 A1    Feb. 16, 2017

Related U.S. Application Data

(60) Provisional application No. 61/918,587, filed on Dec. 19, 2013.

(51) Int. Cl.
*B60P 1/32* (2006.01)
*B60P 3/12* (2006.01)

(52) U.S. Cl.
CPC ............... *B60P 1/32* (2013.01); *B60P 3/122* (2013.01)

(58) Field of Classification Search
CPC .................................. B60P 1/32; B60P 3/122
See application file for complete search history.

(56) References Cited

U.S. PATENT DOCUMENTS

| 3,094,173 | A | 6/1963 | Hausmann et al. | |
|---|---|---|---|---|
| 4,796,537 | A | 1/1989 | Besser | |
| 4,841,870 | A | 6/1989 | Coles | |
| 5,011,362 | A | 4/1991 | Pijanowski | |
| 2002/0062686 | A1* | 5/2002 | Keaton | B60P 1/4421 73/116.01 |
| 2008/0091309 | A1 | 4/2008 | Walker | |
| 2011/0254248 | A1* | 10/2011 | Elkayam | B60P 3/07 280/415.1 |
| 2012/0189415 | A1* | 7/2012 | Robinson | B60P 3/122 414/462 |

* cited by examiner

*Primary Examiner* — Saul Rodriguez
*Assistant Examiner* — Ashley K Romano
(74) *Attorney, Agent, or Firm* — Shaddock Law Group, PC

(57) ABSTRACT

A 240 degrees radially rotatable deck assembly rotatable in either direction without requiring resetting in a park position and requiring only a rotatable outer ring of a slew gear connected to a rotatable sub-frame attached to the deck, a fixed inner ring of the slew gear affixed to a fixed sub-frame fixed to a frame of the assembly and only a single hydraulic motor requiring no cylinders and only one main valve body with incorporated electric solenoids reducing the complexity of the plumbing and the weight of the assembly resulting in lower construction and maintenance costs, improved fuel economy and allowing an increased load weight. The assembly includes a positive holding brake that eliminates blow-by of the rotating section and is rotatable in either direction without requiring being reset in a park position. Such a deck is especially useful on a tow truck.

18 Claims, 9 Drawing Sheets

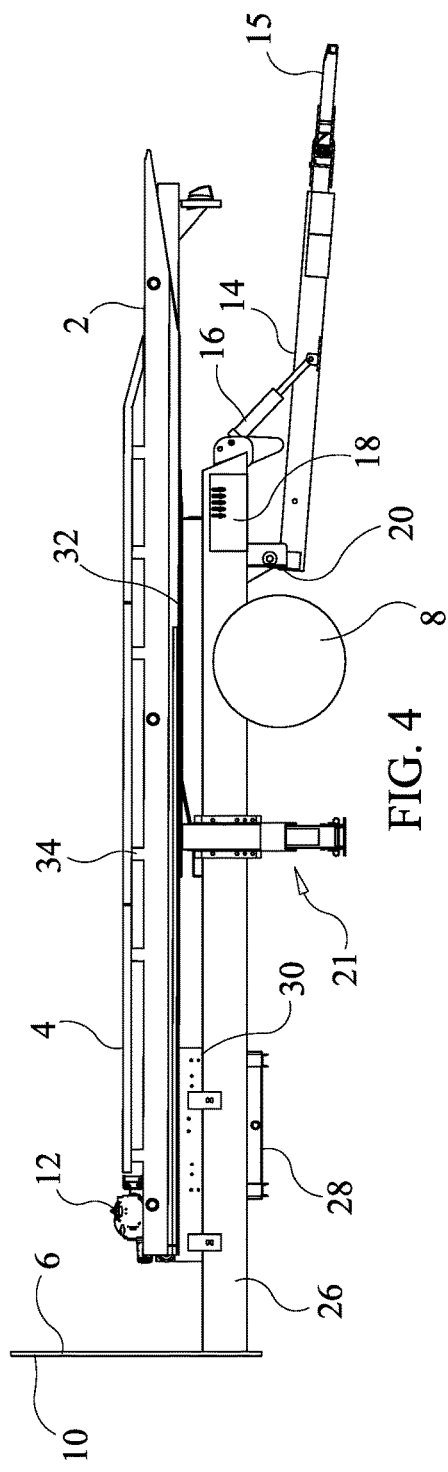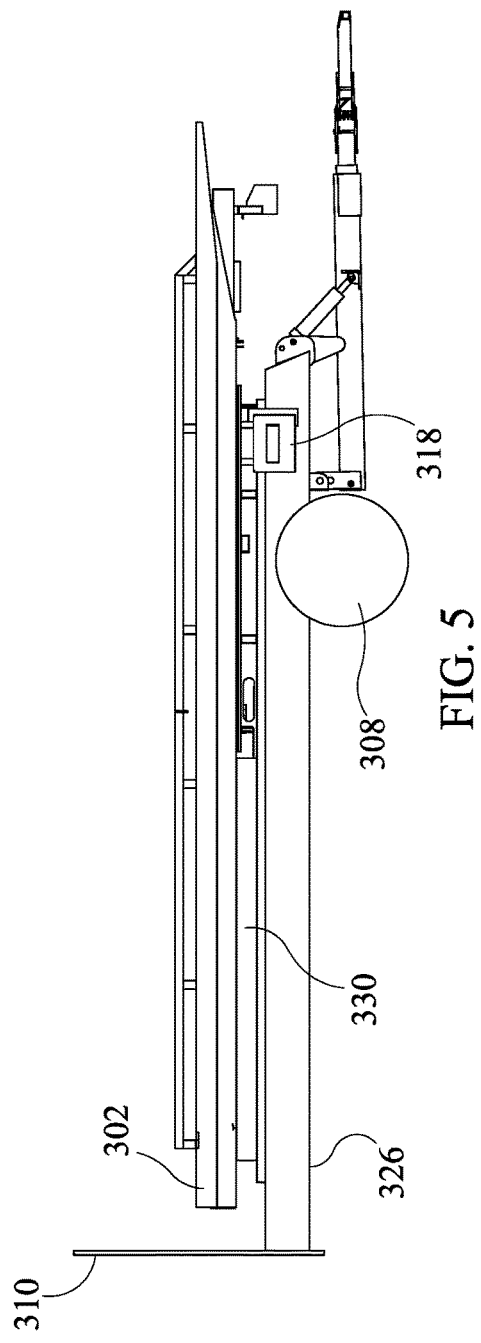

RADIUS ROTATING FLATBED

CROSS-REFERENCE TO RELATED APPLICATIONS

This is a Patent Cooperation Treaty Application of Provisional Application No. 61/918,587 filed on Dec. 19, 2013.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to tow trucks and, more particularly, to a roll-back flatbed tow truck with a deck that can rotate or spin a total of 240 degrees.

The background information discussed below is presented to better illustrate the novelty and usefulness of the present invention. This background information is not admitted prior art.

A tow truck (also referred to as a wrecker, breakdown truck, recovery truck or breakdown lorry) is used to transport disabled motor vehicles to another location, such as a repair garage, or to recover disabled motor vehicles off-road. Vehicles that require towing often are those involved in breakdown or collisions, or those that are to be impounded for legal reasons. The tow truck was invented in 1916 by a garage worker, Ernest Holmes, Sr., of Chattanooga, Tenn., after he was forced to pull a car out of a creek using blocks, ropes, and six men. There are several types of tow trucks used today.

"Hook and chain" tow trucks (also known as a "sling truck" or "belt lift truck") is exactly as it sounds. A hook and a chain are used to tow the cargo. They work by wrapping chains around axles and frames of vehicles that require a tow. The vehicle to be towed is drawn aloft by a boom winch, which is part of the tow truck, to rest against a pair of heavy rubberized mats so the customer's vehicle can be towed on its other axle. This type of towing causes scratches and damage to the vehicle being towed, so they are mainly used to tow wrecked and junk vehicles. They still may be useful for towing vehicles that have one or two of the front or rear wheels missing or for pickup trucks and other vehicles that have steel bumpers.

"Wheel-Lift" (or "spectacle lift" when the cradle resembles a pair of squared spectacles) tow trucks evolved from the hook and chain technology to produce a large metal yoke that can be fitted under the front or rear wheels to cradle them, drawing the front or rear end of the vehicle clear of the ground by a pneumatic or hydraulic hoist so it can be towed, which reduces potential damage to the car.

"Boom" is not a specific type of tow truck, but a piece of equipment used on many types of tow trucks. An adjustable boom winch aids vehicle recovery from a ditch, culvert, over an embankment, or any place the vehicle cannot be safely backed-up to.

"Integrated" (also referred to as a "Self Loader" Snatcher, Quick Pick or Repo Truck) refers to tow trucks that have boom and wheel-lift integrated into one unit and are often used as light duty trucks to repossess vehicles or move illegally parked vehicles. Most have controls for the apparatus inside the cab of the tow truck to make quick pick-up possible without the inconvenience of exiting the truck to hook up the vehicle. Heavy duty trucks are also manufactured with integrated lift.

These are the most common arrangements, but by no means exclusive, as there are flatbed units that offer a wheel-lift, boom trucks that can recover but not tow, and wheel-lift units that offer a combination boom with sling.

"Rollback" trucks have a long empty truck bed that has a flat top, which is also referred to as a "flatbed" or a "deck". The truck itself has a hydraulic system in place to move the flatbed up and down and to tilt it so that it can be used as a ramp to provide for loading of cars onto the flatbed. For boats and non-drivable vehicles, a winch can be used to drag them up the ramp onto the bed. Once the vehicle is set on the flatbed, the hydraulic system is used to even out the ramp. This is usually the preferred towing method as it avoids having to drag the vehicle and, thus, has become the most popular piece of equipment for the towing industry.

Recent rollback tow truck improvements include the ability to swing the truck's flatbed ninety degrees in either direction. This choice of flatbed positioning reduces, but does not eliminate the need for additional equipment when doing vehicle recovery and also reduces, but does not eliminate, the need to reposition the tow truck during recovery.

SUMMARY

Despite all of the recent innovations in tow truck structure and function, as discussed above, the present Inventor realized that further improvement in the degree of rotation of a support deck would be useful. For example, flatbed tow trucks are frequently required to retrieve and unload vehicles in hard-to-reach situations, such as in vehicles off the road in culverts, at the bottom of a hill, or perched on the side of a cliff where space to maneuver a tow truck is limited, or non-existent. Tow trucks also are relied on for moving and positioning the detachable, self-contained units, referred to as PODS, on aircraft, spacecraft, other vehicles, or vessels, in addition to moving vehicles in crowded parking lots. In each of these situations, there may be little or no room to maneuver the truck. Accordingly, the present Inventor developed the following inventive concepts to be useful for any rotatable support deck including tow trucks.

The inventive concepts taught herein are directed towards a deck having an increased degree of rotation with a minimal amount of structure required to achieve the increased rotatability. One industry that can benefit greatly from a greater degree of rotation for its support deck is the flatbed tow truck industry. Using the inventive concepts taught herein, a new generation flatbed tow truck having a deck radially rotatable a full 240 degrees, as compared to the maximum 180 degrees of rotation currently is herein described. The present inventive principles require only a slew gear (such as is offered by Kaydon®) positioned between and connecting a compact sized, thin, light, and stream-lined fixed sub-frame bolted to the truck frame and a rotatable sub-frame connected to the deck of the truck with an inner ring of the slew gear bolted to the fixed sub-frame and an outer ring of the slew gear bolted to the rotatable sub-frame providing for the rotatable outer to revolve around the inner ring. Taking both the inner and outer rings of the slew gear into consideration, there are 42 bolts connecting the slew gear to the two sub-frames which displaces the weight of the deck. Slew gears are well known in the art The internal configuration of slew gears (also known as slewing ring bearings) consists of deep groove gothic arch raceways and maximum ball complement resulting in a four-point contact design that provides for moment, thrust, and radial load capacities. Additionally and importantly, the full 240 degree rotation of the deck requires only a single hydraulic motor to be paired with the slew gear. The hydraulic motor requires no cylinders and requires only one main valve body with incorporated electric solenoids, of requiring a family of valves and a multitude of accessory parts to produce rotation, as is required by the currently available art. Thus, there is no need for a large, heavy disc, a separate electric solenoid valve body, and two main valves as are all required by currently available art. Additionally, two electric solenoid valve bodies, four cartridge valves, flow control valves, a counter balance valve, and 3 lock valves are all eliminated from the claimed structure. Reducing the number of valves required to only one main valve further reduces the amount and complexity of the plumbing required. Further, two hydraulic cylinders and their accompanying hoses are eliminated, which means that flow controls are no longer required for the rotating function. Eliminating the requirement of a large, heavy, immobilized guide disc to support the rotating subframe member, as is required in currently available art, reduces the weight of the vehicle and eliminates tire clearance issues. The all new structure of the present invention results in lower construction costs as fewer parts are required, as well as eliminating the cost and time required for general maintenance of all of the parts that are no longer required. Less structure translates to a lighter truck that both improves fuel economy and allows the truck to increase the weight of its load.

Even with the significant increase in the deck rotation of the claimed invention, braking the rotation motion is smooth and safe due to the incorporation of a positive holding brake built into the hydraulic motor. The default state of a positive holding brake is "ON", that is, when the rotating deck is not rotating and there is no flow of hydraulic fluid from the valve body to the hydraulic motor the brake remains in the "ON" state. The brake is only released, that is, is in the "OFF" state when the deck is rotating. Another benefit of incorporating the positive holding brake into the claimed structure is that it eliminates any danger of having the deck continue to rotate for a second or two after the brake is engaged, because when a positive holding brake is engaged braking action is instant. The unwanted, and potentially dangerous, motion that can occur after a non-positive brake is engaged is referred to by those in the trade as "blow by." Tow trucks that do not have a positive holding brake are susceptible to occurrences of blow-by which makes braking on inclined surfaces problematic.

Another innovation of the tow truck made following the present inventive concept is that the present invention requires only the action of pressing a button that controls clockwise and counterclockwise rotation. Currently available art requires a select cylinder and a rotate cylinder to rotate the deck. The select cylinder resets the deck into the park position before the rotate cylinder is able to rotate the bed 90 degrees to the left or right from any position, thus requiring multiple steps to rotate the deck. According to the inventive concept of the present invention only one hydraulic motor is required to rotate the slew gear.

The present inventive concept also provides for a reduced bed height that is made possible by mounting the deck lower on the truck frame. This also lowers the truck's center of gravity which increases the stability of the truck and reduces chances for a roll-over. The reduced deck height also provides for safer loading and unloading as a deck lower to ground level means a lower load angle and less chance of damaging the cab.

According to the inventive principles the two up/down cylinders, which provide for the deck to be raised and lowered, are mounted lower that has been previously possible. The lower mounting points for these cylinders provides for a greater mechanical leverage point. This means there is less stress on the cylinders and less chances for failure requiring expensive and time-inefficient repairs.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not, therefore, to be considered limiting in scope. Thus, the invention will be described and explained with additional specificity and detail through the use of the accompanying drawings, in which:

FIG. 4 is an elevation view of an example of the present invention, as shown in FIG. 1.

FIG. 5 is an elevation view of a currently available art.

REFERENCE NUMBERS USED TO REFER TO PARTS DISCUSSED

Figure 1:
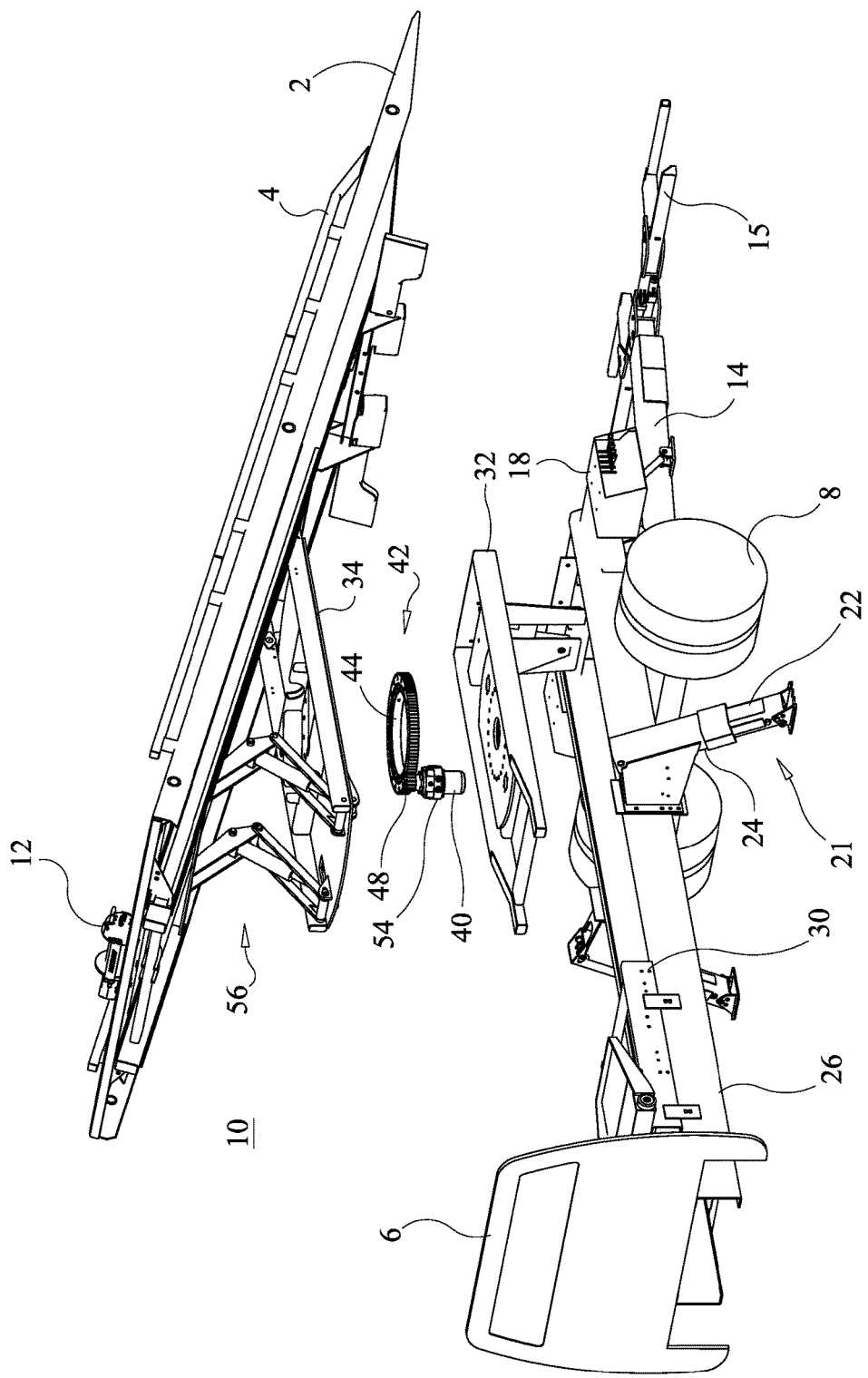
FIG. 1 is an exploded view of an example of the present invention.

Reference Numbers used to refer to Parts of Present Invention

2 A deck that rotates up to 240°.
3 End of deck 2 proximate cab 6.
4 Bed rails.
6 Cab.
8 Tires.
10 Radius Rotating Rollback with deck 2 that rotates up to 240°.
12 Deck winch.
14 Lower unit of wheel lift 15.
15 Wheel lift.
16 Wheel lift cylinder.
18 Valve body—the single valve that is required (main valve).
21 Outrigger.
22 Outrigger—inner tube.
24 Outrigger—outer tube.
26 Truck frame.
28 Hydraulic fluid tank.
30 Bed lock sub-frame.
32 Fixed sub-frame.
34 Rotating sub-frame.
40 Hydraulic motor.
42 Slew gear.
44 Inner ring of slew gear 42.
46 Outer ring of slew gear 42.
48 Pinion gear.
50 PS Up/down cylinder.
52 DS Up/down cylinder.
54 A fitting with a controlled rate orifice.
56 Scissor frame lift assembly.
h Height of Radius Rotating Rollback 10.
Reference Numbers used to Refer to Parts of an Example of Currently Available Art
302 A deck that rotates up to 180°.
308 Tire.
310 Rotating Rollback with deck 302 that rotates up to 180°.
318 Valve body.
326 Truck frame.
330 Bed lock sub-frame.
336 Large heavy guide disc.
$h_{pr}$ Height of 310.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms with the example of a rotatable bed tow truck being just one. The present invention contemplates providing up to 240 degrees rotation for structures where rotation is desired. Therefore, the embodiments described herein are provided with the understanding that the present disclosure is intended as illustrative and is not intended to limit the invention to the embodiments described herein.

Figure 1A:
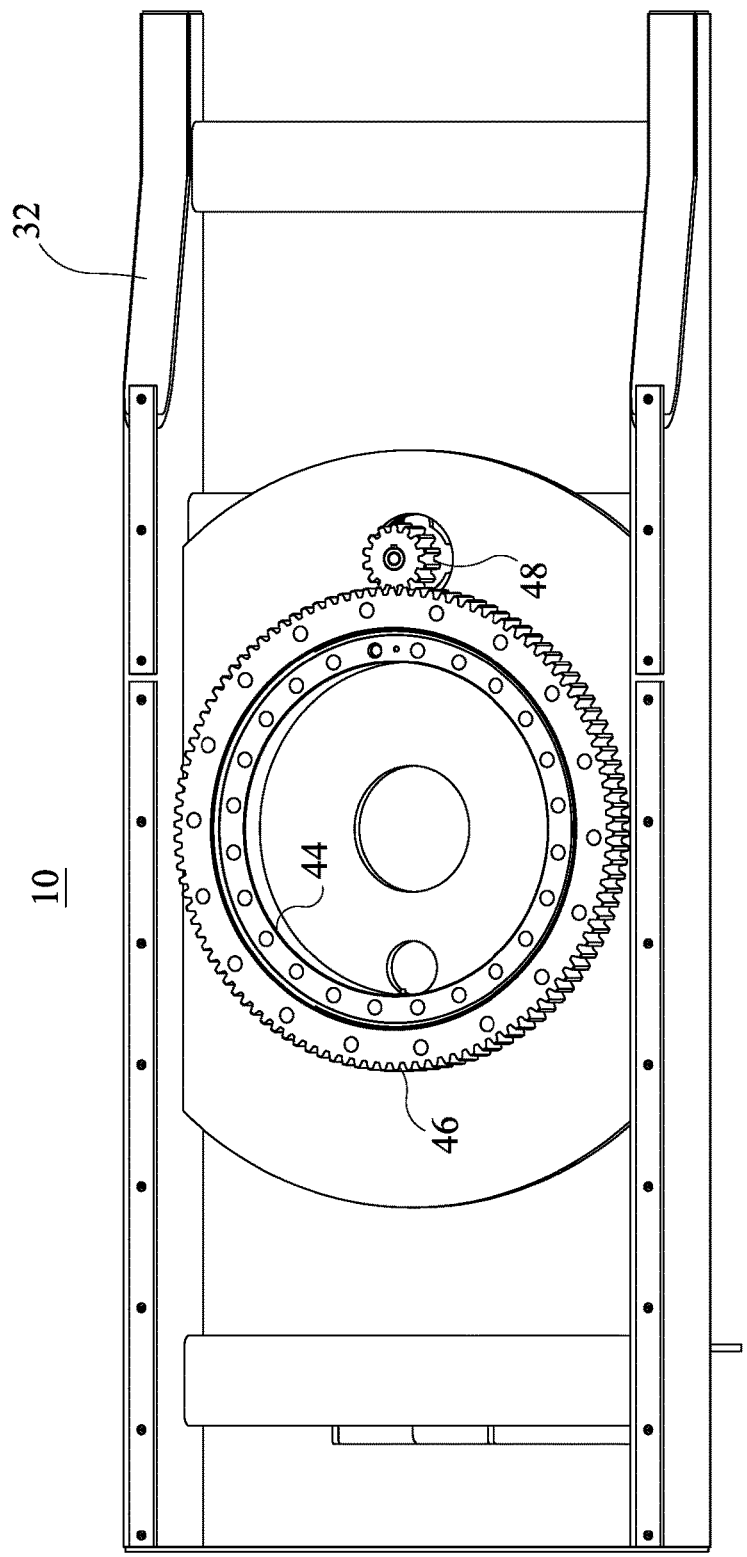
FIG. 1A is a close-up view of the slew gear used in the present invention.
Figure 1B:
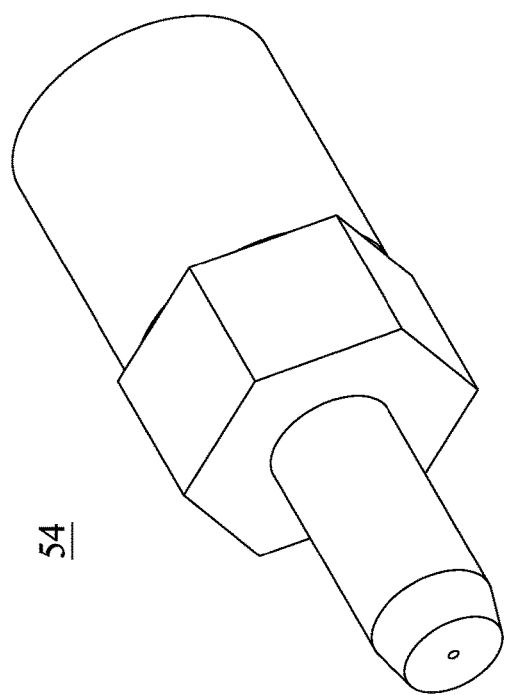
FIG. 1B is a close-up view of a fitting with a controlled rate orifice used in the present invention.
Figure 2:
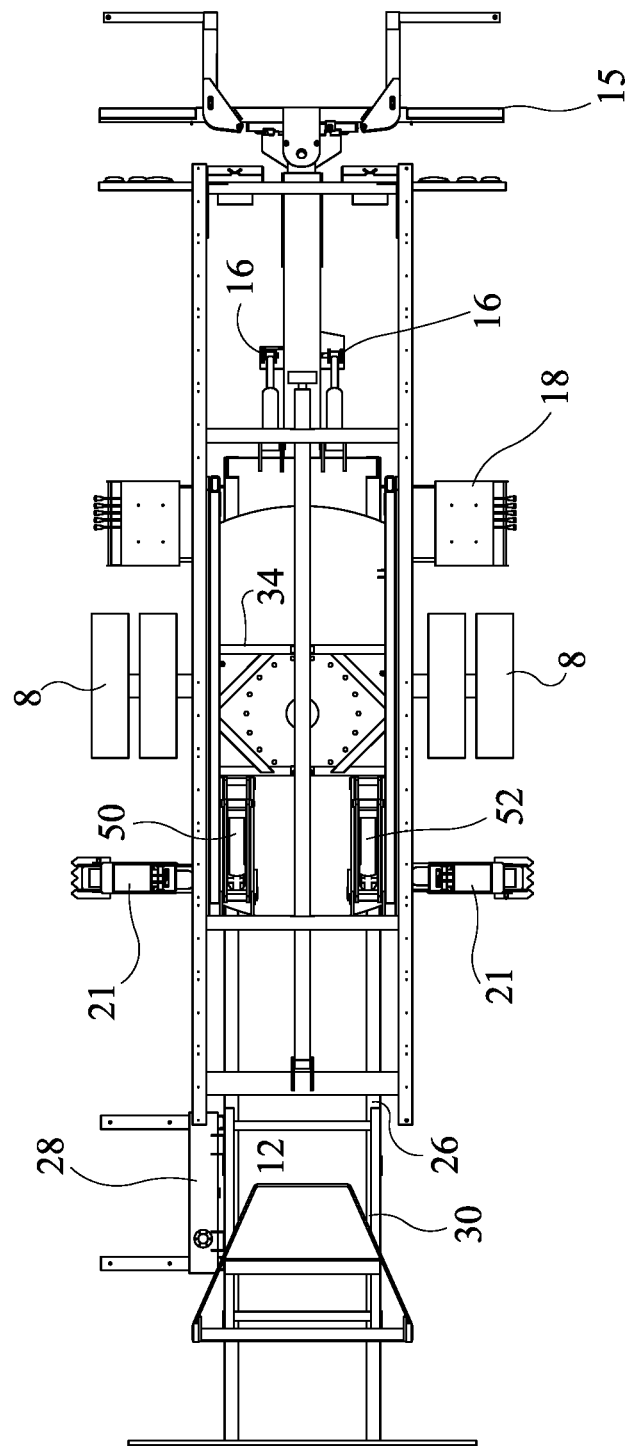
FIG. 2 is a top plan view of an example of the present invention, as shown in FIG. 1.

Turning now to the drawings, FIGS. 1-4 illustrate how to make a tow truck that is capable of rotating its deck a full 240 degrees. The truck that is used to describe the principles of the claimed invention is referred to as "Radius Rotating Rollback" tow truck 10. The 240 degrees rotation of the truck's deck depends on the cooperation between the trucks "upper structure" and its "lower structure". The upper structure includes deck 2, rotating sub-frame 34, and scissor frame lift assembly 56 that connects deck 2 and sub-frame 34. Rotating sub-frame 34 provides the 240 degrees rotation to deck 2 and scissor frame lift assembly 56 enables the pivotal movement of the deck. The lower structure comprises fixed sub-frame 32 attached to the upper side of truck frame 26. Fixed sub-frame 32 and rotating sub-frame 34 are connected to each other by inner ring 44 and outer ring 46 of slew gear 42. Slew gear 42 is basically a ball bearing, except the outer ring or edge has teeth on it like a gear. Inner ring 44 of slew gear 42 is bolted to fixed sub-frame 32. Outer rotatable ring 46 of slew gear 42 is structured to revolve around inner ring 44 and is bolted to rotating sub-frame 32. Inner ring 44 is fixed to sub-frame 32 using 24 bolts and outer ring 46 is fixed to sub-frame 32 using 18 bolts providing for a 42 bolt connection of the two sub-frames, which provides for the displacement of the weight of the deck. FIG. 1A provides a close-up view of slew gear 42. FIG. 2, a top plan view, illustrates the positioning of rotating sub-frame 34 with respect to the upper structure. Driving the rotation of outer ring 46 is hydraulic motor 40 attached to slew gear 44, as illustrated in FIG. 1. Note the minimal areal size of slew gear 44 and motor 40 compared to the large heavy guide disc 336 of the currently available art (see FIG. 6). Using slew gear 44 also eliminates any tire clearance issues. Hydraulic motor 40 together with outer rotatable ring 46 of slew gear 42 and rotatable sub-frame 34 provides for the 240 degree rotation of the deck. Connected to hydraulic motor 40 is fitting 54 with a controlled rate orifice to control the rotation rate of pinion gear 48 which communicates motion from motor 40 to the rotatable outer ring 46 that rotates deck 2. FIG. 1B, a close-up view, illustrates fitting 54 with controlled rate orifice. According to the inventive principles up/down cylinders 50 and 52, which provide for the deck to be raised and lowered, are mounted so that they do not protrude over the top surface of the rotating sub-frame, this means that the up/down cylinders are mounted lower that has been previously possible. The lower mounting of these cylinders provides for a greater mechanical leverage point. This means there is less stress on the cylinders and less chances for failure requiring expensive and time-inefficient repairs.

Additional parts of tow truck 10 include: fronts-piece of truck cab 6, bed rails 4, deck winch 12, tires 8, wheel lift 15, wheel lift cylinders 16 (see FIGS. 2 and 4), lower unit 14 of wheel lift 15, outriggers 21 (one on each side of truck frame 26) each made up of outrigger inner tube 22 and outrigger outer tube 24, bed-lock sub-frame 30, hydraulic fluid tank 28, and main valve 18 having an incorporated electric solenoid. Value 18 is the only value in the structure required for rotation of the deck, as compared to the complex set of valves and accompanying parts required by presently available art. Note: although it appears in FIG. 2 that there are two valves, it is two valve covers that are seen with single valve body 18 beneath the DS valve cover.

Figure 3B:
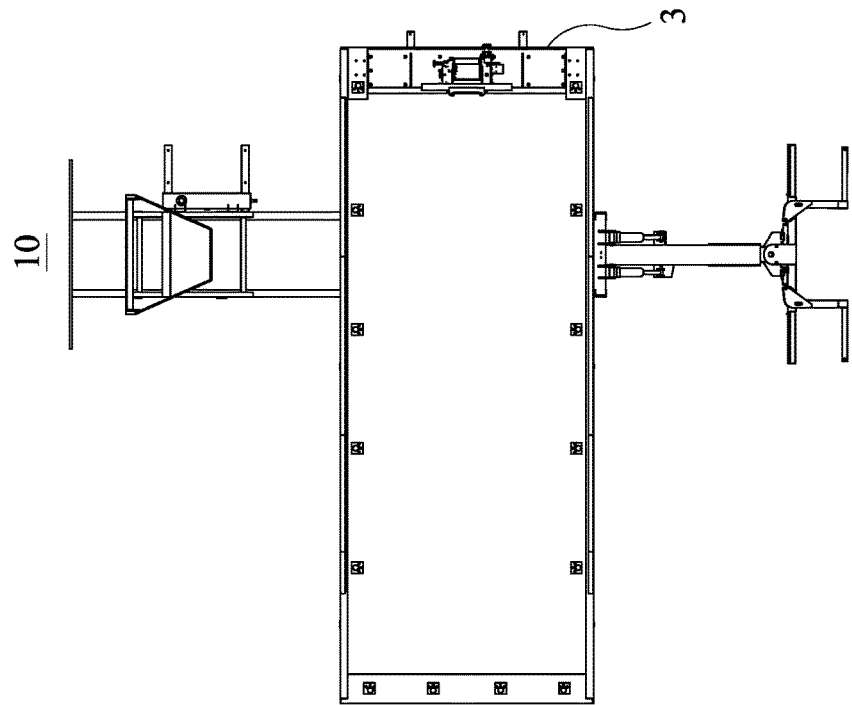
FIG. 3B is a top plan view of an example of the present invention, as shown in FIG. 1 with the deck's rearward end oriented 90° toward the driver's side.
Figure 3A:
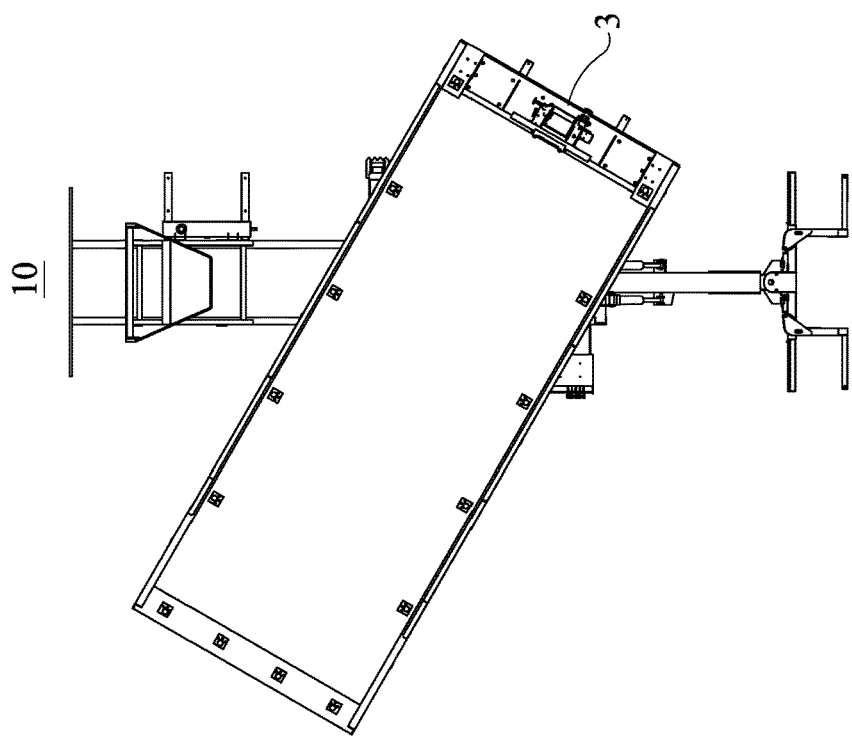
FIG. 3A is a top plan view of an example of the present invention, as shown in FIG. 1 with the deck' rearward end oriented 120° toward the driver's side.
Figure 3D:
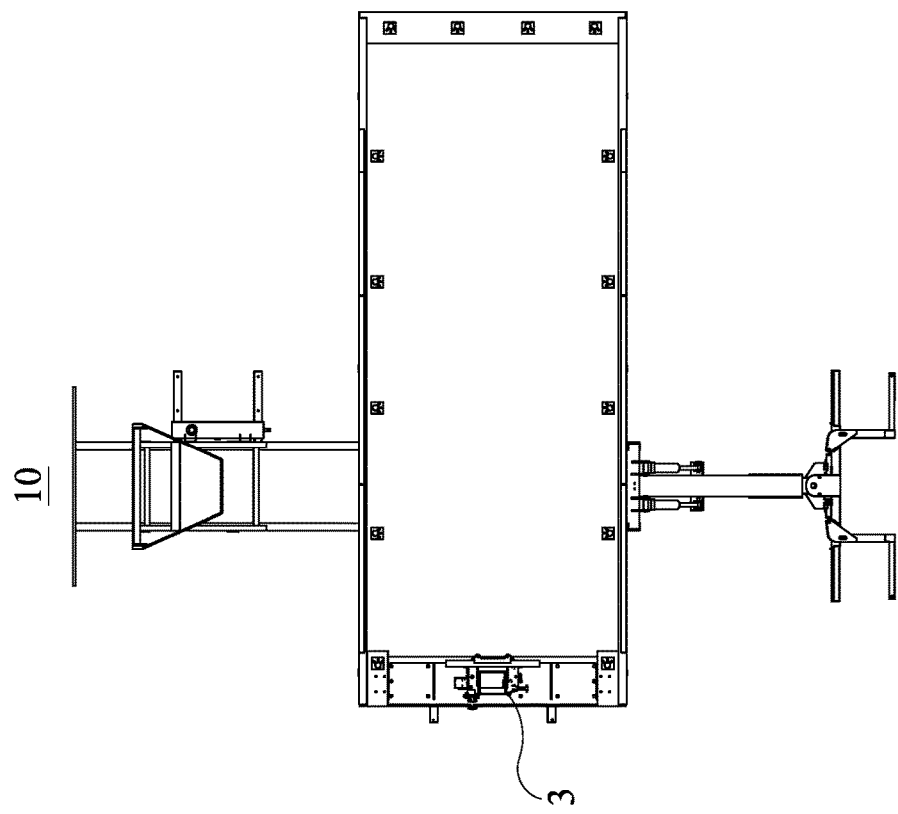
FIG. 3D is a top plan view of an example of the present invention, as shown in FIG. 1 with the deck's rearward end oriented 90° toward the passenger's side.
Figure 3C:
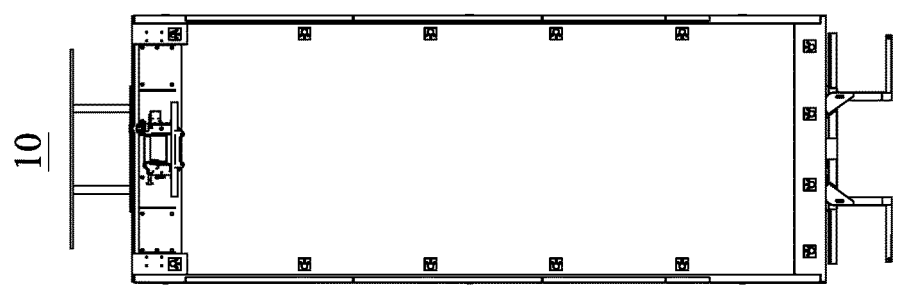
FIG. 3C is a top plan view of an example of the present invention, as shown in FIG. 1 with the deck in its park position.
Figure 3F:
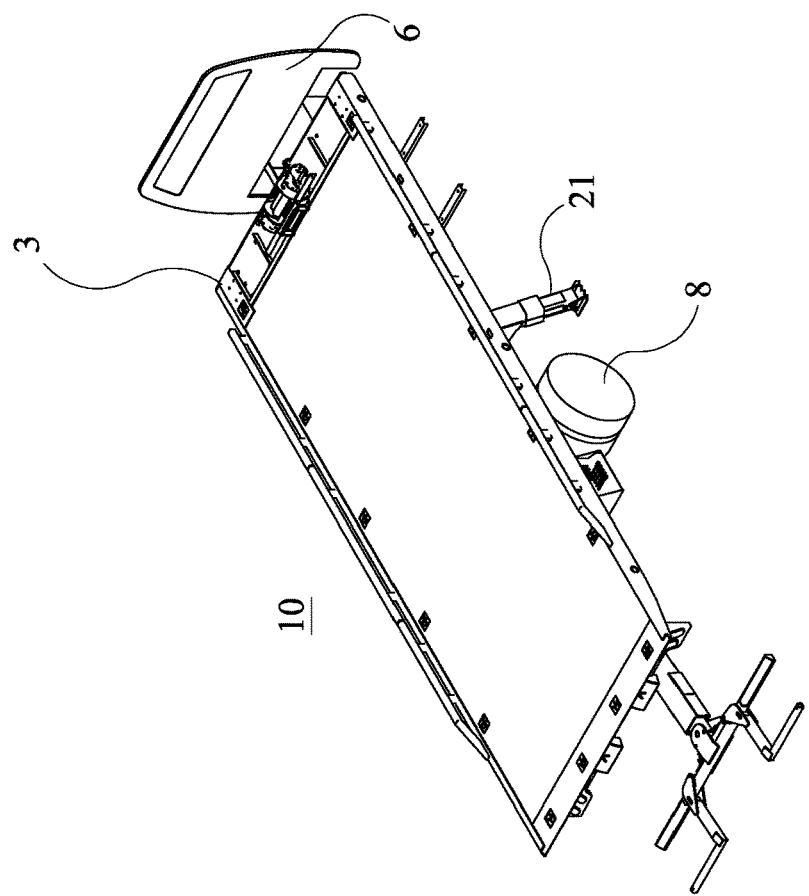
FIG. 3F is a perspective view of an example of the present invention, as shown in FIG. 1 with the deck in its park position.
Figure 3E:
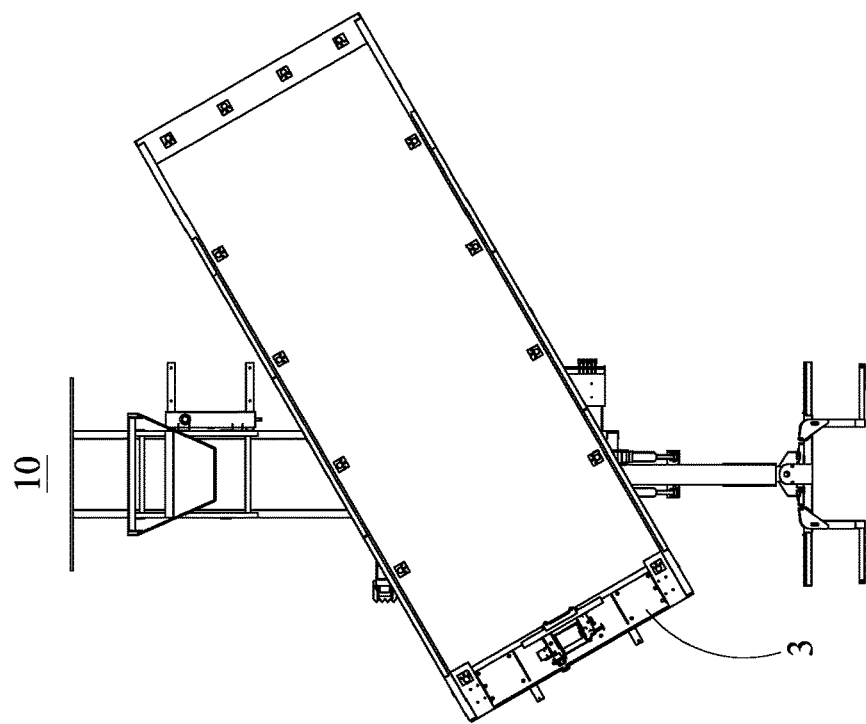
FIG. 3E is a top plan view of an example of the present invention, as shown in FIG. 1 with the deck's rearward end oriented 120° toward the passenger's side.

FIGS. 3A-3E, all top plan views, illustrate how the exemplar rotatable bed tow truck is used and the extent of rotation of the rotating deck. FIG. 3A illustrates the deck's forward end 3 oriented through 120 degrees from the passenger's side. FIG. 3B illustrates the deck's forward end 3 oriented through 90 degrees from the passenger's side. FIG. 3C illustrates the deck in its park position. FIG. 3D illustrates the deck's forward end 3 oriented through 90 degrees from the driver's side. FIG. 3E illustrates the deck's forward end 3 oriented through to 120 degrees from the driver's side about the truck frame. FIG. 3F, a perspective top view illustrates the deck and truck frame with the deck in its park position.

FIG. 4, an elevation view, illustrates an exemplar tow truck of the present invention, ready for use. Note that the top surface of the deck of the present invention is 24⅜ inches "h" above the bottom surface of the truck frame.

FIG. 5 an elevation view, illustrates structural features of an example of a currently available tow truck 310 having deck 302 radially rotatable up to 90 degrees in each direction. Additional structure includes sub-frame 330 sitting on truck frame 326, tires 308, and two valve bodies 318 (one on each side of the deck and each with a solenoid, not shown).

One of the important differences achieved by the inventive principles is illustrated in FIG. 4 and FIG. 5. FIG. 5 illustrates an example of a currently available art having its top surface of deck 302 at a height ($h_{pr}$) of 27⅛ inches above the bottom surface of its truck frame 326. In contrast, the tow truck made using the concepts of the claimed art has its top surface of deck 2 at a height (h) of 24⅜ inches above the bottom surface of its truck frame 26. This means that deck 2 of the tow truck made according to the principles of the present invention is 2¾ inches closer to the ground resulting in the truck of the present invention having a lower center of gravity which increases the truck's stability reducing chances for a roll-over. The reduced height deck also provides for safer loading and unloading as a deck lower to ground level means a lower load angle and less chance of damaging the cab.

Figure 6:
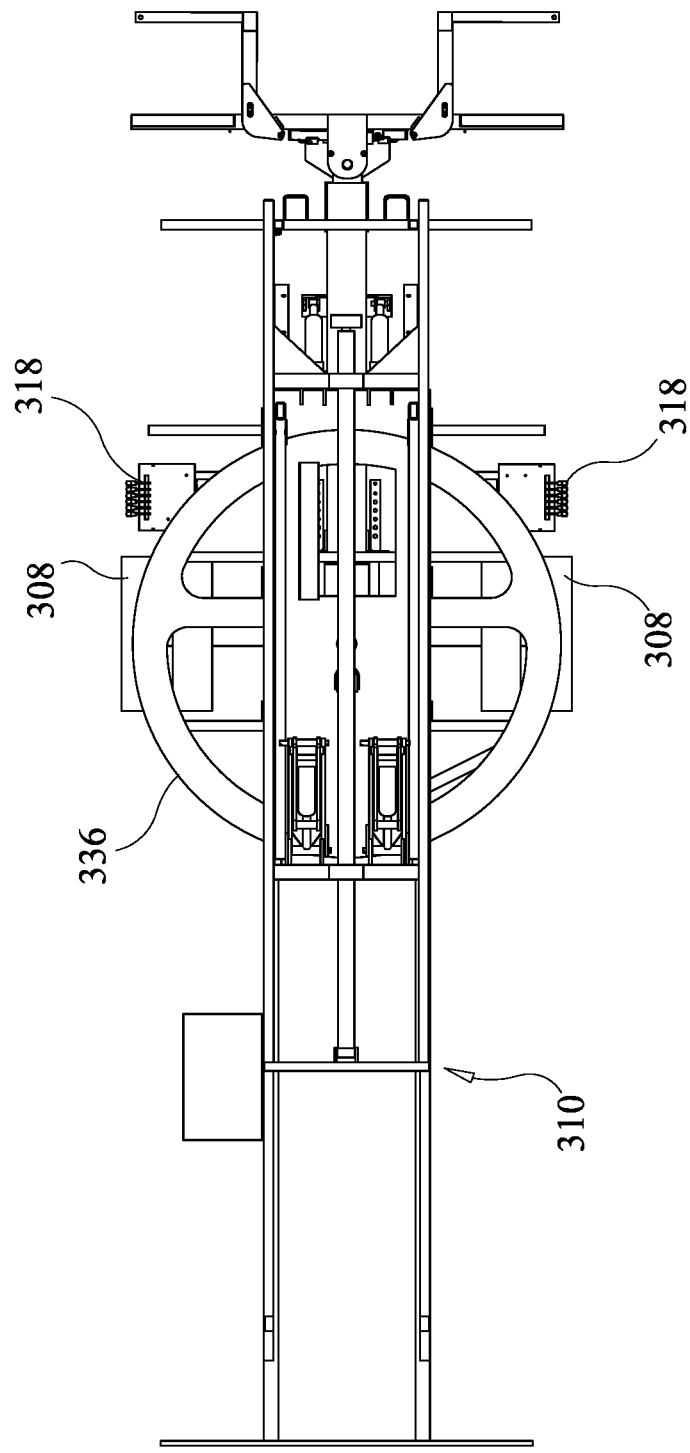
FIG. 6 is a top plan view of a currently available art, as shown in FIG. 5.

FIG. 6, a top plan view, viewed with FIG. 1 and FIG. 2 clearly illustrates the difference in areal size between slew gear 44 of the present invention and guide disc 336 used in the available art. There is no doubt that large heavy guide disc 336 protrudes over tires producing a tire clearance issue.

To use a tow truck of the current invention once the truck is started, the power take-off is engaged. Then, the valve body is operated by moving its levers up or down to extend the DS (driver's side) and PS (passenger's side) outriggers. The valve body is then operated to lower the wheel lift and to slide the bed (deck) back. After it is decided to which side and angle the bed is to be rotated, the valve body is used to rotate and to raise/lower the bed, and to operate the winch.

Thus, it has been shown how to make and use a tow truck according to the present inventive concept the many innovations over the currently available art that it offers, which includes rotation of the deck up to 240 degrees that is a 60 degree rotation increase; a lower mounting for the deck resulting in lowering the center of gravity increasing the trucks stability and producing a safer, lower load angle. The use of a large, heavy guide disc has been eliminated which has eliminated the tire clearance issues. There is an overall reduction in the mechanical parts including the elimination of two hydraulic cylinders, hoses and valves that were previously required to rotate the deck. The present inventive principles requires only one valve body reducing both pluming and valves, which in turn reduces the weight of the tow truck simultaneously increasing the amount of weight the truck is able to carry and improving fuel economy. Reducing the number of mechanical parts decreases wear and tear, thus reducing cost of construction and maintenance. Flow controls are no longer required for the rotating function. The incorporation of a positive holding brake eliminates "blow-by" of the rotating section. The rotating section can now rotate to any position from any orientation without reset and the up/down cylinders are now able to be mounted lower providing better performance.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A rotatable and pivotable deck, comprising:
   a support deck;
   a scissor-frame lift assembly;
   a structural frame;
   a rotatable sub-frame, wherein said deck is pivotably attached or coupled to said rotatable sub-frame, wherein said scissor-frame lift assembly couples said rotatable sub-frame to said deck, and wherein said scissor-frame lift assembly enables pivotable movement of said deck relative to said rotatable sub-frame;
   a fixed sub-frame, wherein said fixed sub-frame is fixedly attached to and supported by said structural frame;
   a slew gear having a fixed ring and a rotatable ring, wherein said fixed ring is fixedly attached to said fixed sub-frame, and wherein said rotatable ring is fixedly attached to said rotatable sub-frame, such that said rotatable sub-frame is rotatable relative to said fixed sub-frame; and
   a hydraulic motor having a controlled rate orifice and a pinion gear directly connected to said rotatable ring for communicating motion from said motor to said rotatable sub-frame such that said rotatable sub-frame and said deck are rotatable relative to said fixed sub-frame.

2. The rotatable deck, as recited in claim 1, wherein said hydraulic motor is a single hydraulic motor having only a single valve body.

3. The rotatable deck, as recited in claim 2, wherein said valve body has an incorporated electric solenoid.

4. The rotatable deck, as recited in claim 1, further including a positive holding brake that eliminates blow-by of the rotating section.

5. The rotatable deck, as recited in claim 4, wherein said fixed sub-frame and said rotatable sub-frame together with said slew gear support said deck.

6. The rotatable deck, as recited in claim 1, wherein said controlled rate orifice controls said pinion gear rotation rate.

7. The rotatable deck, as recited in claim 1, wherein said deck is rotatable in either direction without requiring being reset in a park position.

8. The rotatable deck, as recited in claim 1, wherein a top surface of said deck is at a maximum height of 60.96 centimeters (24⅜ inches) above the bottom surface of its truck frame.

9. A tow truck, comprising:
   a rotatable, pivotable support deck;
   a scissor-frame lift assembly, wherein said scissor-frame lift assembly connects said rotatable sub-frame to said deck, and wherein said scissor-frame lift assembly enables pivotable movement of said deck relative to said rotatable sub-frame;
   a structural frame;

a rotatable sub-frame;

a fixed sub-frame, wherein said fixed sub-frame is fixedly attached to and supported by said structural frame;

a slew gear having a fixed ring and a rotatable ring, wherein said fixed ring is fixedly attached to said fixed sub-frame, and wherein said rotatable ring is fixedly attached to said rotatable sub-frame; and a pinion gear attached or coupled to said rotatable ring for communicating motion from a motor to said rotatable sub-frame such that said rotatable sub-frame and said deck are rotatable relative to said fixed sub-frame.

10. The tow truck, as recited in claim 9, wherein said hydraulic motor is a single hydraulic motor requiring only a single valve body.

11. The tow truck, as recited in claim 9, further including a positive holding brake that eliminates blow-by of the rotating section.

12. The tow truck, as recited in claim 9, wherein said fixed sub-frame and said rotatable sub-frame together with said slew gear support said deck.

13. The tow truck, as recited in claim 9, wherein said controlled rate orifice controls said pinion gear rotation rate.

14. The tow truck, as recited in claim 9, wherein said deck is rotatable in either direction without requiring being reset in a park position.

15. The tow truck, as recited in claim 9, wherein a top surface of said deck is at a maximum height of 60.96 centimeters (24⅜ inches) above the bottom surface of its truck frame.

16. The tow truck, as recited in claim 9, wherein said valve body has an incorporated electric solenoid.

17. A process for making a rotatable deck, comprising:
providing a rotatable, pivotable support deck;
providing a scissor-frame lift assembly;
providing a structural frame;
providing a rotatable sub-frame;
providing a fixed sub-frame, and
providing a slew gear having a fixed ring and a rotatable ring,
connecting said scissor-frame lift assembly to said rotatable sub-frame and to said deck such that said scissor-frame lift assembly enables pivotable movement of said deck relative to said rotatable sub-frame,
attaching said fixed sub-frame fixedly to said structural frame that supports said sub-frame;
attaching said fixed ring fixedly to said fixed sub-frame;
attaching said rotatable ring fixedly to said rotatable sub-frame, and
connecting a hydraulic motor having a controlled rate orifice and a pinion gear directly connected to said rotatable ring for communicating motion from said motor to said rotatable sub-frame and said deck to rotate said rotatable sub-frame and said deck relative to said fixed sub-frame.

18. The process, as recited in claim 17, wherein said deck is rotatable in either direction without requiring being reset in a park position.

* * * * *